United States Patent
Kim et al.

(10) Patent No.: US 8,856,282 B2
(45) Date of Patent: Oct. 7, 2014

(54) CHANNEL SERVER, CHANNEL PREDICTION SERVER, TERMINAL, AND METHOD FOR FAST CHANNEL SWITCHING USING PLURALITY OF MULTICASTS INTEROPERATING WITH PROGRAM RATING PREDICTION

(75) Inventors: Sangkyune Kim, Gwangju (KR); Jai Sang Koh, Gwangju (KR); Byung-Tak Lee, Suwon-si (KR); Ilkyun Park, Seoul (KR); Byongkwon Moon, Gwangju (KR); Kyunghun Kim, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 472 days.

(21) Appl. No.: 12/794,036

(22) Filed: Jun. 4, 2010

(65) Prior Publication Data
US 2011/0106915 A1 May 5, 2011

(30) Foreign Application Priority Data
Nov. 5, 2009 (KR) .................. 10-2009-0106313

(51) Int. Cl.
*G06F 15/16* (2006.01)
*H04N 7/173* (2011.01)
*H04N 21/462* (2011.01)
*H04L 29/06* (2006.01)
*G06Q 30/02* (2012.01)

(52) U.S. Cl.
CPC ............... *G06F 15/16* (2013.01); *H04N 7/173* (2013.01); *H04N 21/4622* (2013.01); *H04L 29/06* (2013.01); *G06Q 30/02* (2013.01)

USPC ......................................... 709/219

(58) Field of Classification Search
CPC .... G06F 15/16; H04N 7/173; H04N 21/4622; H04L 29/06; G06Q 30/02
USPC ......................................... 709/219
See application file for complete search history.

(56) References Cited

U.S. PATENT DOCUMENTS

| | | | |
|---|---|---|---|
| 6,128,649 A * | 10/2000 | Smith et al. | 709/217 |
| 6,452,915 B1 * | 9/2002 | Jorgensen | 370/338 |
| 6,512,776 B1 * | 1/2003 | Jones et al. | 370/432 |
| 6,813,270 B1 * | 11/2004 | Oz et al. | 370/394 |
| 6,823,394 B2 * | 11/2004 | Waldvogel et al. | 709/231 |
| 7,558,870 B2 * | 7/2009 | Parker | 709/231 |
| 8,014,393 B1 * | 9/2011 | Faheem et al. | 370/390 |
| 2001/0055305 A1 * | 12/2001 | Oz et al. | 370/389 |

(Continued)

FOREIGN PATENT DOCUMENTS

| | | |
|---|---|---|
| JP | 10-066046 A | 3/1998 |
| JP | 2005-006339 A | 1/2005 |

(Continued)

*Primary Examiner* — Ondrej Vostal
(74) *Attorney, Agent, or Firm* — Kile Park Reed & Houtteman PLLC

(57) ABSTRACT

Provided are a channel server, a channel prediction server, a terminal, and a method for a fast channel switching. The channel server may generate at least one delay multicast stream from an original multicast stream by applying a different delay value based on channel preference information, and may determine an optimal multicast stream from the at least one delay multicast stream, and transmit, to a terminal, response information associated with the optimal multicast stream in response to query information associated with the original multicast stream received from the terminal.

18 Claims, 7 Drawing Sheets

(56) References Cited

U.S. PATENT DOCUMENTS

| | | | |
|---|---|---|---|
| 2003/0233540 A1* | 12/2003 | Banerjee et al. | 713/153 |
| 2004/0044762 A1* | 3/2004 | Peacock | 709/224 |
| 2005/0081244 A1 | 4/2005 | Barrett et al. | |
| 2005/0135318 A1* | 6/2005 | Walton et al. | 370/338 |
| 2005/0147045 A1* | 7/2005 | Alam et al. | 370/236 |
| 2005/0198130 A1* | 9/2005 | Bosloy et al. | 709/204 |
| 2006/0047845 A1* | 3/2006 | Whited et al. | 709/231 |
| 2006/0083263 A1* | 4/2006 | Jagadeesan et al. | 370/487 |
| 2006/0222323 A1 | 10/2006 | Sharpe et al. | |
| 2007/0047650 A1* | 3/2007 | Vilei et al. | 375/240.16 |
| 2007/0121678 A1* | 5/2007 | Brooks et al. | 370/505 |
| 2007/0174880 A1* | 7/2007 | Fite et al. | 725/87 |
| 2007/0250890 A1* | 10/2007 | Joshi et al. | 725/120 |
| 2007/0283397 A1* | 12/2007 | Scholl | 725/86 |
| 2008/0077701 A1* | 3/2008 | Kongalath et al. | 709/232 |
| 2008/0109557 A1* | 5/2008 | Joshi et al. | 709/231 |
| 2008/0152061 A1* | 6/2008 | Kozat | 375/358 |
| 2009/0013362 A1* | 1/2009 | Liu et al. | 725/110 |
| 2009/0028182 A1* | 1/2009 | Brooks et al. | 370/466 |
| 2009/0080328 A1* | 3/2009 | Hu et al. | 370/230 |
| 2009/0138239 A1* | 5/2009 | Golani et al. | 702/186 |
| 2009/0175272 A1* | 7/2009 | Hedaoo et al. | 370/390 |
| 2009/0196516 A1* | 8/2009 | Perlman et al. | 382/239 |
| 2009/0201889 A1* | 8/2009 | Sundaresan et al. | 370/336 |
| 2009/0228946 A1* | 9/2009 | Perlman et al. | 725/110 |
| 2009/0328090 A1* | 12/2009 | Randolph et al. | 725/14 |
| 2010/0036964 A1* | 2/2010 | Cedervall et al. | 709/231 |
| 2010/0122282 A1* | 5/2010 | DuBose | 725/32 |
| 2010/0166051 A1* | 7/2010 | Chung et al. | 375/225 |
| 2010/0226262 A1* | 9/2010 | Liu et al. | 370/252 |
| 2010/0229211 A1* | 9/2010 | Lee et al. | 725/109 |
| 2010/0293587 A1* | 11/2010 | Haimi-Cohen et al. | 725/120 |
| 2010/0329355 A1* | 12/2010 | Pandey et al. | 375/240.25 |
| 2011/0072484 A1* | 3/2011 | Horen | 725/118 |
| 2011/0099065 A1* | 4/2011 | Georgis et al. | 705/14.52 |
| 2011/0176547 A1* | 7/2011 | Lejeune et al. | 370/390 |

FOREIGN PATENT DOCUMENTS

| | | |
|---|---|---|
| KR | 10-2003-0055323 A | 7/2003 |
| KR | 10-2005-0035071 A | 4/2005 |
| KR | 10-2006-0115423 A | 11/2006 |
| KR | 10-2008-0047244 A | 5/2008 |
| KR | 100831325 B1 | 5/2008 |
| KR | 1020080053087 A | 6/2008 |
| KR | 10-0859709 B1 | 9/2008 |
| KR | 10-2008-0106799 | 12/2008 |
| KR | 10-0880893 B1 | 1/2009 |
| WO | 2007/086869 A1 | 8/2007 |
| WO | 2008/076023 A1 | 6/2008 |

* cited by examiner

CHANNEL SERVER, CHANNEL PREDICTION SERVER, TERMINAL, AND METHOD FOR FAST CHANNEL SWITCHING USING PLURALITY OF MULTICASTS INTEROPERATING WITH PROGRAM RATING PREDICTION

CROSS-REFERENCE TO RELATED APPLICATION

This application claims the benefit of Korean Patent Application No. 10-2009-0106313, filed on Nov. 5, 2009, in the Korean Intellectual Property Office, the disclosure of which is incorporated herein by reference.

BACKGROUND

1. Field of the Invention

The present invention relates to a channel server, a channel prediction server, a terminal, and a method for a fast channel switching.

2. Description of the Related Art

An Internet Protocol Television (IPTV) service denotes a service of combining various communication broadcastings provided based on an IP network. In real-time broadcasting constituting a basis of the IPTV service, a channel switching speed becomes a very important factor in an aspect of user satisfaction. In the case of the real-time broadcasting provided using a conventional analog broadcasting network, the channel switching speed is less than or equal to one second. On the other hand, in the case of the real-time broadcasting service provided using an IPTV network, the channel switching speed is about a few seconds. Accordingly, the channel switching speed needs to be enhanced in order to provide an advanced IPTV service.

In a multicast-based IPTV network, factors affecting the channel switching speed may include, for example, an Internet Group Management Protocol (IGMP) transfer time from a terminal to a router, a multicast stream transfer time from the router to the terminal, a stream buffering time, a Program Identifier (PID) detection time, a time spent due to a Group of Picture (GOP) structure to retrieve an Independent-frame (I-frame), a stream decoding time, a screen output time, and the like. Among the above factors, the IGMP transfer time from the terminal to the router, the multicast stream transfer time from the router to the terminal, the stream decoding time, the screen output time, and the like correspond to basic factors and thus may have a low enhancement probability with respect to the channel switching speed. On the other hand, the stream buffering time, the PID detection time, and the time spent due to the GOP structure to retrieve the I-frame may have a relatively high enhancement probability with respect to the channel switching speed.

SUMMARY

An aspect of the present invention provides a channel server, a channel prediction server, a terminal, and a method for providing an advanced channel switching service by predicting a channel to be switched by a user based on a program rating prediction.

Another aspect of the present invention also provides a channel server, a channel prediction server, a terminal, and a method for significantly enhancing a channel switching speed by generating at least one delay multicast stream in advance based on channel preference information that is determined using a prediction rating prediction, and by enabling a terminal to join an optimal multicast address based on the generated at least one multicast stream.

Another aspect of the present invention also provides a channel server, a channel prediction server, a terminal, and a method for effectively adapting to a channel switching preference of terminals by determining a number of multicast streams to be generated based on channel preference information.

Another aspect of the present invention also provides a channel server, a channel prediction server, a terminal, and a method for more effectively using an available bandwidth secured by a provider by generating and changing in real time a number of multicast streams to be generated for each channel.

According to an aspect of the present invention, there is provided a channel server including: a streaming module to generate at least one delay multicast stream from an original multicast stream by applying a different delay value based on channel preference information; and an analysis module to determine an optimal multicast stream from the at least one delay multicast stream, and to transmit, to a terminal, response information associated with the optimal multicast stream in response to query information associated with the original multicast stream received from the terminal.

The channel preference information may include number information associated with a number of the at least one delay multicast stream, and is received from a channel prediction server. The channel prediction server may determine the number information based on statistical information stored in association with the original multicast stream.

The statistical information may include information associated with the original multicast stream.

The channel prediction server may analyze a program rating of the original multicast stream based on the statistical information according to at least one prediction algorithm, and determine the number information based on the analyzed program rating.

The analysis module may analyze in real time a decodable Independent-frame (I-frame) with respect to the original multicast stream, and may determine, as the optimal multicast stream, a delay multicast stream capable of providing the decodable I-frame among the at least one delay multicast stream based on the analysis result.

The analysis module may determine the optimal multicast stream based on at least one of a received time of the query information, a stream processing delay time, and a delay time occurring due to a query of the terminal with respect to the original multicast stream.

The channel preference information may include umber information associated with a number of the at least one delay multicast stream that is generated from the original multicast stream. The streaming module may include: a prediction module to determine the number information based on statistical information stored in association with the original multicast stream; and a multicast streaming module to generate the at least one delay multicast stream from the original multicast stream based on the number information.

According to another aspect of the present invention, there is provided a channel prediction server including: a database to receive statistical information associated with an original multicast stream from a channel server, and to maintain the statistical information; and a prediction module to generate channel preference information associated with the original multicast stream based on the statistical information, and to transmit the channel preference information to the channel server. The channel server may generate at least one delay multicast stream from the original multicast stream by applying a different delay value based on the channel preference information.

The database may receive the statistical information in correspondence to a request to the channel server, or may periodically receive the statistical information from the channel server. The prediction module may transmit the channel preference information in correspondence to a request from the channel server, or may periodically transmit the channel preference information to the channel server.

According to still another aspect of the present invention, there is provided a terminal including: a channel query module to transmit, to a channel server, query information associated with an original multicast stream, and to receive response information associated with an optimal multicast stream; an Internet Group Management Protocol (IGMP) module to request a router for a multicast group join with respect to the optimal multicast stream based on the response information; a stream parsing module to receive the optimal multicast stream from the router; and a stream decoder to output the optimal multicast stream to a display. The channel server may generate at least one delay multicast stream from the original multicast stream by applying a different delay value based on channel preference information, may determine the optimal multicast stream from the at least one delay multicast stream, and may transmit, to the terminal, response information associated with the optimal multicast stream in response to the query information.

The IGMP module may join a multicast group with respect to the optimal multicast stream. When a predetermined period of time is elapsed, the IGMP module may request the router for a group join with respect to the original multicast stream. The stream parsing module may receive the optimal multicast stream or the original multicast stream from the router. The stream decoder may output the optimal multicast stream or the original multicast stream to the display.

The IGMP module may join the multicast group with respect to the optimal multicast stream. When the predetermined period of time is elapsed, the IGMP module may request the router for the group join with respect to the original multicast stream using the response information, and requests the router for a group leave with respect to the optimal multicast stream using the response information.

The IGMP module may join a multicast group with respect to the optimal multicast stream, and may request the router for a group join with respect to the original multicast group using the response information. The stream parsing module may receive the optimal multicast stream from the route. When a predetermined period of time is elapsed, the stream parsing module may receive the original multicast stream from the router.

The channel preference information may include number information associated with a number of the at least one delay multicast stream. The channel server may receive the number information from a channel prediction server, and may generate the at least one delay multicast stream from the original multicast stream based on the number information.

EFFECT

According to embodiments of the present invention, there may be provided a channel server, a channel prediction server, a terminal, and a method for providing an advanced channel switching service by predicting a channel to be switched by a user based on a program rating prediction.

Also, according to embodiments of the present invention, there may be provided a channel server, a channel prediction server, a terminal, and a method for significantly enhancing a channel switching speed by generating at least one delay multicast stream in advance based on channel preference information that is determined using a prediction rating prediction, and by enabling a terminal to join an optimal multicast address based on the generated at least one multicast stream.

Also, according to embodiments of the present invention, there may be provided a channel server, a channel prediction server, a terminal, and a method for effectively adapting to a channel switching preference of terminals by determining a number of multicast streams to be generated based on channel preference information.

Also, according to embodiments of the present invention, there may be provided a channel server, a channel prediction server, a terminal, and a method for more effectively using an available bandwidth secured by a provider by generating and changing in real time a number of multicast streams to be generated for each channel.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
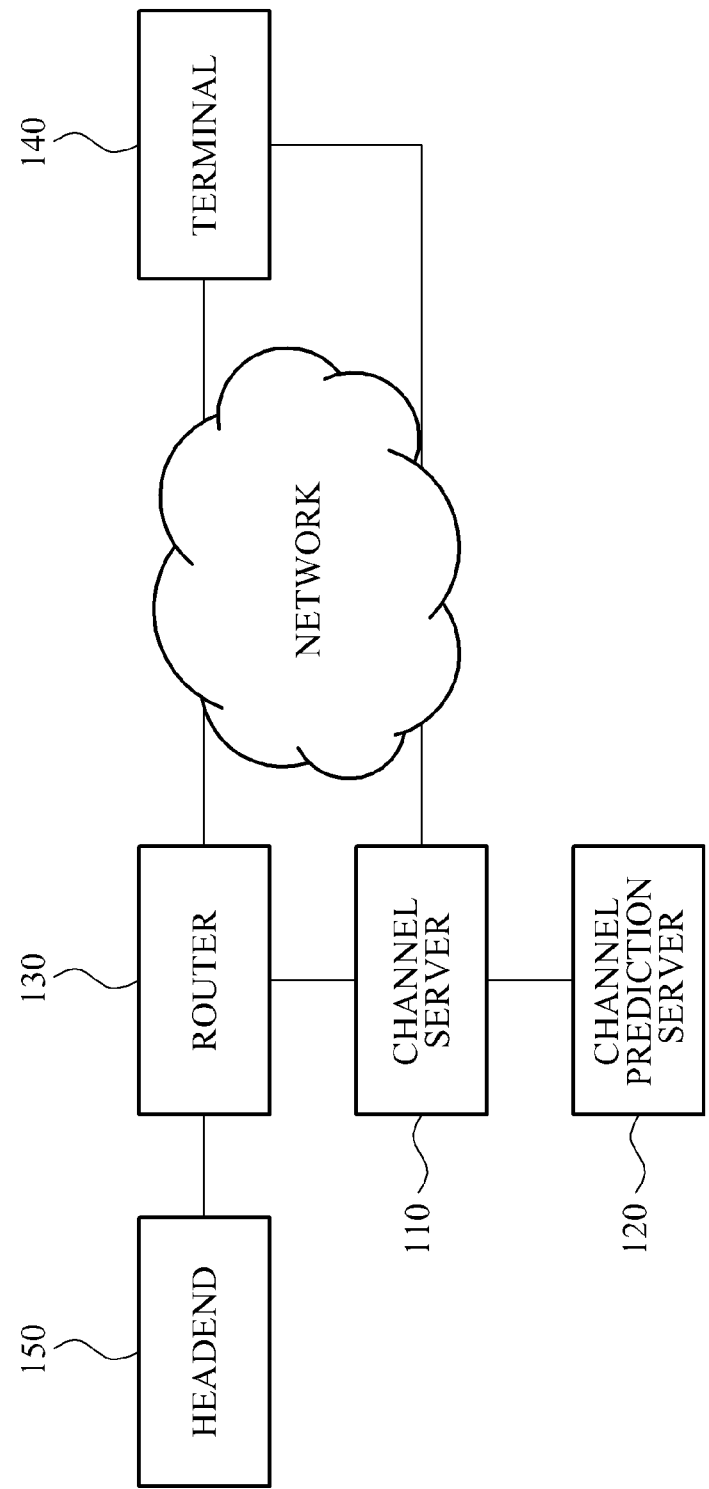
FIG. 1 is a block diagram illustrating a relationship among a channel server, a channel prediction server, and a terminal according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram illustrating a relationship among a channel server 110, a channel prediction server 120, and a terminal 140 according to an embodiment of the present invention.

The channel server 110 may generate at least one delay multicast stream by applying a different delay value based on channel preference information with respect to each original multicast stream desired to be broadcast, and may dynamically analyze information associated with an original multicast stream. The terminal 140 may transmit, to the channel server 110 over a network, a query about information associated with an optimal multicast stream and receive a response from the channel server 110. The terminal 140 may request a router 130 for an Internet Group Management Protocol (IGMP) group with respect to the optimal multicast stream. The optimal multicast stream may denote a delay multicast stream capable of most rapidly providing the terminal 140 with an Independent-frame (I-frame) among the at least one delay multicast stream.

The channel prediction server 120 may determine the channel preference information based on statistical information stored in association with the original multicast stream, and may transmit the determined channel preference information to the channel server 110. The channel preference information may include number information associated with a number of the at least one delay multicast stream. The channel prediction server 120 may be included as a prediction module inside the channel server 110.

A headend 150 may provide the original multicast stream to the channel server 110. The channel server 110 may receive, directly or via a switch (not shown) from the headend 150, the original multicast stream desired to be broadcast. The headend 150 may generate at least one delay multicast stream from the original multicast stream by applying a different time delay value, and may transmit the generated at least one delay multicast stream to the router 130. The channel sever 110 may generate information associated with an optimal multicast stream information among the at least one delay multicast stream, and transmit information associated with the optimal multicast stream to the terminal 140. The terminal 140 may request the router 130 for an IGMP group join with respect to the optimal multicast stream based on information associated with the optimal multicast stream.

The channel server 110 may request the router 130 for the above IGMP group join instead of the terminal 140. In this case, the channel server 110 may transmit the IGMP group join to the router 130 directly or a switch (not shown) configured to perform a connection expansion function.

The router 130 may receive multicast streams from the channel server 110 to transmit the received multicast streams to the terminal 140. The multicast streams may include the original multicast stream, the at least one delay multicast stream, and the optimal multicast stream.

The terminal 140 may be connected to the channel server 110 and the router 130 via the network. For example, the terminal 140 may include a user computer or a set-top box. The terminal 140 may transmit, to the channel server 110, a query about an optimal multicast stream associated with a channel switching input from a user, and may receive, from the channel server 110, information associated with the optimal multicast stream. The terminal 140 may request the router 130 for an IGMP group join based on information associated with the optimal multicast group, and may receive the optimal multicast group from the router 130.

Hereinafter, configurations and operations of the channel server 110, the channel prediction server 120, the router 130, and the terminal 140 will be further described with reference to FIGS. 2 through 7.

Figure 2:
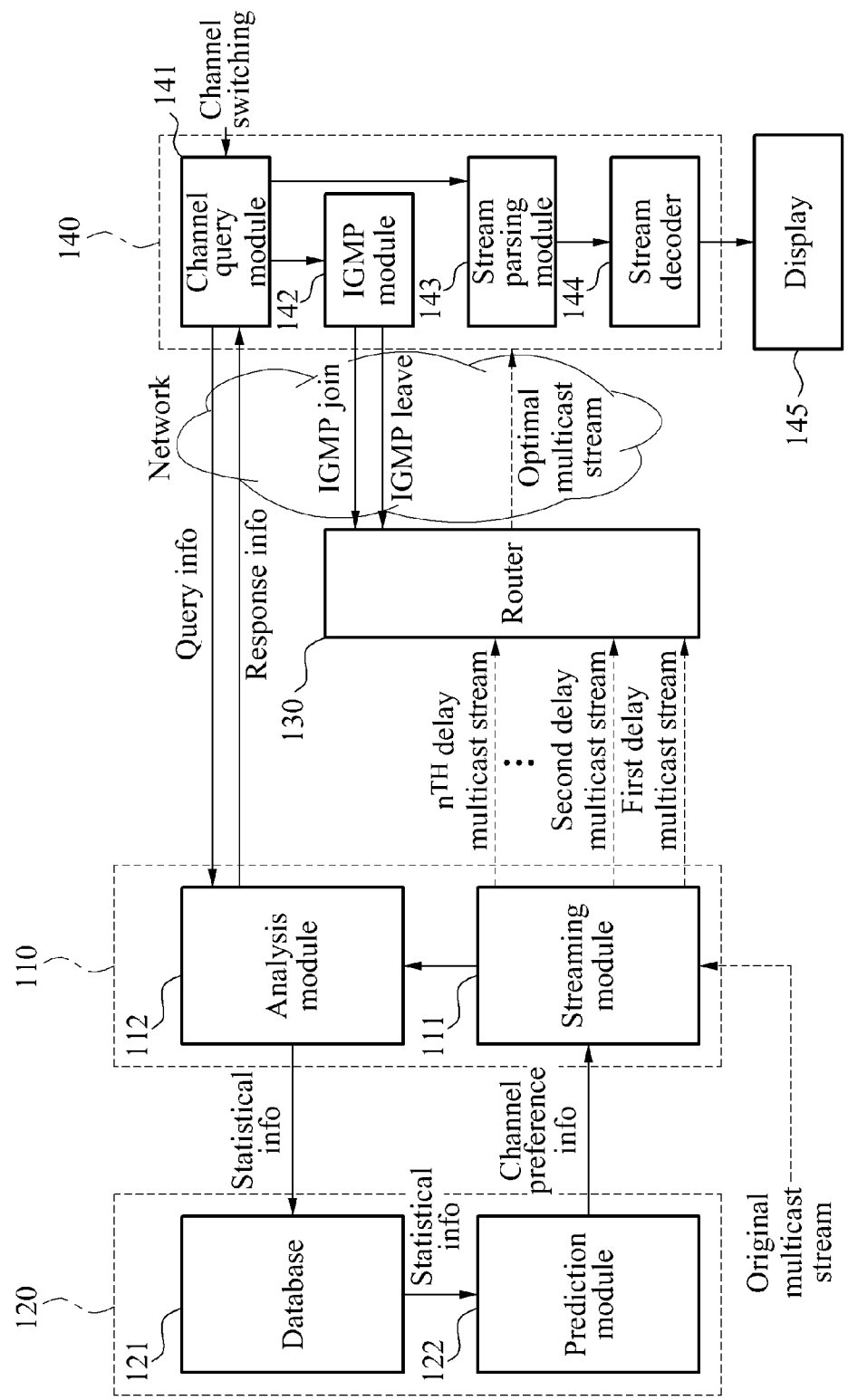
FIG. 2 is a block diagram illustrating a structure of a channel server, a channel prediction server, and a terminal according to an embodiment of the present invention.

FIG. 2 is a block diagram illustrating a structure of a channel server 110, a channel prediction server 120, and a terminal 140 according to an embodiment of the present invention.

As shown in FIG. 2, the channel server 110 may include a streaming module 111 and an analysis module 112.

The streaming module 111 may generate at least one delay multicast stream from an original multicast stream by applying a different delay value based on channel preference information.

The channel preference information may include number information associated with a number of the at least one delay multicast streams, and may be received from the channel prediction server 120.

Specifically, the streaming module 111 may generate the at least one delay multicast stream by applying the different delay value to the original multicast stream desired to be broadcast, based on the number information. Here, a different multicast group address and a different port value may be assigned to each of the at least one delay multicast stream. The generated at least one delay multicast stream may correspond to temporary streams for a fast channel switching.

According to an embodiment of the present invention, the terminal 140 may perform the fast channel switching using an optimal stream selected from the temporary streams. When a predetermined period of time is elapsed, the terminal 140 may be switched to receiving of the original stream and remove a temporary stream used as the optimal stream over the network to thereby relieve a network burden.

For example, the streaming module 111 may receive the original multicast stream to identify that number information associated with the original multicast stream is five, and may generate a first delay multicast stream through a fifth delay multicast stream by applying a different time value. For example, the same address group and port value to the original multicast stream may be assigned to the first delay multicast stream by applying a time delay value "0". Also, according to an embodiment, the streaming module 111 may immediately transmit the original multicast stream to the router 13, and may generate at least one delay multicast stream by applying a different time value greater than "0" to the original multicast stream. Next, the streaming module 111 may transmit the generated at least one delay multicast stream to the router 130.

The channel prediction server 120 may determine the number information based on statistical information stored in association with the original multicast stream. The statistical information may include, for example, information associated with the original multicast stream. The statistical information may also include user information. The channel prediction server 120 may analyze a program rating of the original multicast stream based on the statistical information according to at least one prediction algorithm, and determine the number information based on the analyzed program rating. The at least one prediction algorithm may predict a program rating of a channel selected from users, based on previous data of the selected channel. The at least one prediction algorithm may include, for example, a neural network algorithm and a genetic algorithm. The number information may be determined based on an available bandwidth of the channel server 110.

The analysis module 112 may receive query information associated with the original multicast stream from the terminal 140 and then may determine an optimal multicast stream among the at least one delay multicast stream, and transmit response information associated with the optimal multicast stream to the terminal 140.

Specifically, the analysis module 112 may dynamically or in real time analyze information associated with the generated at least one delay multicast stream. For example, every point in time a query for a channel is received from the terminal 140, the analysis module 112 may analyze the at least one delay multicast stream to determine the optimal multicast stream, and may transmit information associated with the optimal multicast stream to the terminal 140 as a response to the query. The terminal 140 may receive the optimal multicast stream and perform a fast channel switching. When a predetermined period of time is elapsed, the terminal 140 may be switched to receiving of the original multicast stream to remove the optimal multicast stream over the network and thereby reduce a network burden.

The analysis module 112 may analyze in real time a decodable Independent-frame (I-frame) with respect to the original multicast stream, and determine, as the optimal multicast stream, a delay multicast stream capable of providing the decodable I-frame based on the analysis result.

For example, the analysis module 112 may analyze in real time a relative time location of the decodable I-frame with respect to the original multicast stream. The analysis module 112 may analyze in real time a relative time location of each of the first delay multicast stream through the fifth delay multicast stream. The relative time location may correspond to a time value calculated based on a distance between a current location of the I-frame on a stream buffer of the analysis module 112 and an entrance of the stream buffer.

The analysis module 112 may analyze a port value and a multicast group address of each delay multicast stream, and may also analyze program designation information of each delay multicast stream such as a Program Association Table (PAT), a Program Map Table (PMT), a Conditional Access Table (CAT), and the like. The program designation information may be identical to the original multicast stream. The analysis module 112 may determine, as the optimal multicast stream, the delay multicast stream capable of most rapidly providing the I-frame to the terminal 140 based on the location analysis result of the I-frame, the analysis result of the multicast group address and the port value, and the analysis result of the program designation information.

According to an embodiment of the present invention, the analysis module 112 may determine the optimal multicast stream based on at least one of a received time of the query information, a stream processing delay time, a delay time occurring due to a query of the terminal 140 with respect to the original multicast stream. The delay time occurring due to the query of the terminal 140 with respect to the original multicast stream may include a network delay time.

Response information of information associated with the optimal multicast stream may include a multicast group address and a port value of a corresponding multicast stream and program designation information. The program designation information may include at least one of a PAT, a PMT, and a CAT. When the optimal multicast stream is different from the original multicast stream, a multicast address group and a port value of the original multicast stream and a shift time of the terminal 140 may be additionally provided to the terminal 140. The shift time denotes a time difference between a group join of the optimal multicast stream and a group join of the original multicast stream. The original multicast stream may be identical to a delay multicast stream of which the time delay value is zero.

The analysis module 112 may perform a temporary IGMP function so that the terminal 140 may more rapidly receive a multicast stream to perform a fast channel switching. Specifically, the analysis module 112 may request the router 130 for an IGMP group join/leave of the optimal multicast stream and an IGMP group join/leave of the original multicast stream, instead of the terminal 140.

As shown in FIG. 2, the channel prediction server 120 may include a database 121 and a prediction module 122.

The database 121 may receive statistical information associated with the original multicast stream from the channel server 110, and maintain the statistical information. The database 121 may receive the statistical information in correspondence to a request to the channel server 110, or may periodically receive the statistical information from the channel server 110. The statistical information may include information associated with the original multicast stream and user information.

The prediction module 122 may generate channel preference information associated with the original multicast stream based on the statistical information, and transmit the channel preference information to the channel server 110. The channel preference information may include number information associated with a number of delay multicast streams.

Specifically, the prediction module 122 may predict and analyze preferred channels of users and a program rating for each channel based on the statistical information. Data obtained through the above analysis may be used as an index to generate at least one multicast stream for each channel within an available bandwidth allowed by a network of channel servers. The data may also function to command the channel server 110 to generate at least one multicast through a connection to the channel server 110. For example, the prediction module 122 may determine the number information as "5" based on the statistical information, and may transmit the number information to the channel server 110.

The channel server 110 may generate at least one delay multicast stream from the original multicast stream by applying a different delay value based on the channel preference information. The channel server 110 may separately generate the at least one multicast stream obtained by applying the different time delay to each original multicast stream based on a result predicted by the channel prediction server 120. For example, the channel server 110 may identify that the number information is "5", and may generate, from the original multicast stream, the first delay multicast stream through the fifth delay multicast stream in which the different time delay is applied.

Also, the prediction module 122 may analyze a program rating of the original multicast stream based on the statistical information according to at least one prediction algorithm, and may determine the number information based on the analyzed program rating. The prediction module 122 may transmit the channel preference information in correspondence to a request from the channel server 110, or may periodically transmit the channel preference information to the channel server 110.

As shown in FIG. 2, the terminal 140 may include a channel query module 141, an IGMP module 142, a stream parsing module 143, a stream decoder 144, and a display 145.

The channel query module 141 may transmit, to the channel server 110, query information associated with the original multicast stream, and may receive response information associated with the optimal multicast stream.

The channel query module 141 may transmit, to the channel server 110, a query about a channel switched by a user, and may receive, as a response thereto, the response information associated with an optimal multicast stream determined among delay multicast streams of an original multicast stream corresponding to the switched channel. The query information may include a channel ID corresponding to the switched channel. The response information may include a multicast group address and a port value of the optimal multicast stream and program designation information.

The channel server 110 may generate at least one delay multicast stream from the original multicast stream by applying a different delay value based on channel preference information. In response to query information, the channel server 110 may determine the optimal multicast stream among the at least one delay multicast stream and may generate response information associated with the optimal multicast stream. The channel preference information may include number information associated with a number of the at least one delay multicast stream.

The channel server 110 may determine the number information based on statistical information stored in association with the original multicast stream.

The channel server 110 may receive the number information from the channel prediction server 120. In this case, the number information may be determined by the channel prediction server 120.

The IGMP module 142 may request the router 130 for a multicast group join with respect to the optimal multicast stream based on the response information. The IGMP module 142 may join the multicast group with respect to the optimal multicast stream. When a predetermined period of time is elapsed, the IGMP module 142 may request the router 130 for a group join with respect to the original multicast stream. The predetermined period of time may correspond to the shift time.

Specifically, the IGMP module 142 may request the router 130 for the optimal multicast stream. For this, the IGMP module 142 may be connected to the router 130 or a switch (not shown) connected to the router 130 using a physical or logical port among interfaces of the router 130. The IGMP module 142 may request the router 130 for an optimal multicast group join using a group address of the optimal multicast stream included in response information associated with the optimal multicast stream, and thereby request the router 130 for the optimal multicast stream.

The IGMP module 142 may receive response information associated with the original multicast stream from the channel server 110, and may join the optimal multicast group. When the shift time is elapsed, the IGMP module 142 may request the router 130 for an original multicast group join using an original multicast group address, and thereby request the router 130 for the original multicast stream. The IGMP module 142 may receive the original multicast stream, and then may leave the optimal multicast group in order to reduce a network burden caused by a waste of a network bandwidth. When the user switches to another channel, the IGMP module 142 may also leave the original multicast group.

The stream parsing module 143 may receive the optimal multicast stream from the router 130. The stream parsing module 143 may also receive the original multicast stream from the router 130. Specifically, the stream parsing module 143 may receive, from the channel query module 141, the port value of the optimal multicast stream, program designation information, and the like. The stream parsing module 143 may actually receive, from the router 130, the optimal multicast stream and the original multicast stream and parse the received optimal multicast stream and original multicast stream.

According to an embodiment of the present invention, the IGMP module 142 may join the multicast group with respect to the optimal multicast stream. When the predetermined period of time is elapsed, the IGMP module 142 may request the router 130 for the group join with respect to the original multicast stream using the response information, and may request the router 130 for a group leave with respect to the optimal multicast stream using the response information. The stream parsing module 143 may receive, from the router 130, the optimal multicast stream and the original multicast stream. For example, the IGMP module 142 may request the router 130 for an IGMP group join using a group address of the optimal multicast stream. When the shift time included in the response information is elapsed, the IGMP module 142 may request the router 130 for the IGMP group join using a group address of the original multicast stream and then may immediately perform a group leave of the optimal multicast stream.

Also, according to an embodiment of the present invention, the IGMP module 142 may join a multicast group with respect to the optimal multicast stream, and may request the router 130 for the group join with respect to the original multicast group using the response information. The stream parsing module 143 may receive the optimal multicast stream from the router 130 and may receive the original multicast stream from the router 130 when the predetermined period of time is elapsed. For example, the IGMP module 142 may request the router 130 for the IGMP group join using the group address of the optimal multicast stream and then may additionally request the router 130 for the IGMP group join using the group address of the original multicast stream. The stream parsing module 143 may receive the optimal multicast stream from the router 130. When the shift time is elapsed, the stream parsing module 143 may immediately receive the original multicast stream from the router 130.

The stream decoder 144 may output the optimal multicast stream to the display 145. Specifically, the stream decoder 144 may decode the optimal multicast stream or the original multicast stream parsed from the stream parsing module 143, and may output the decoded optimal multicast stream or original multicast stream to the display 145.

Figure 3:
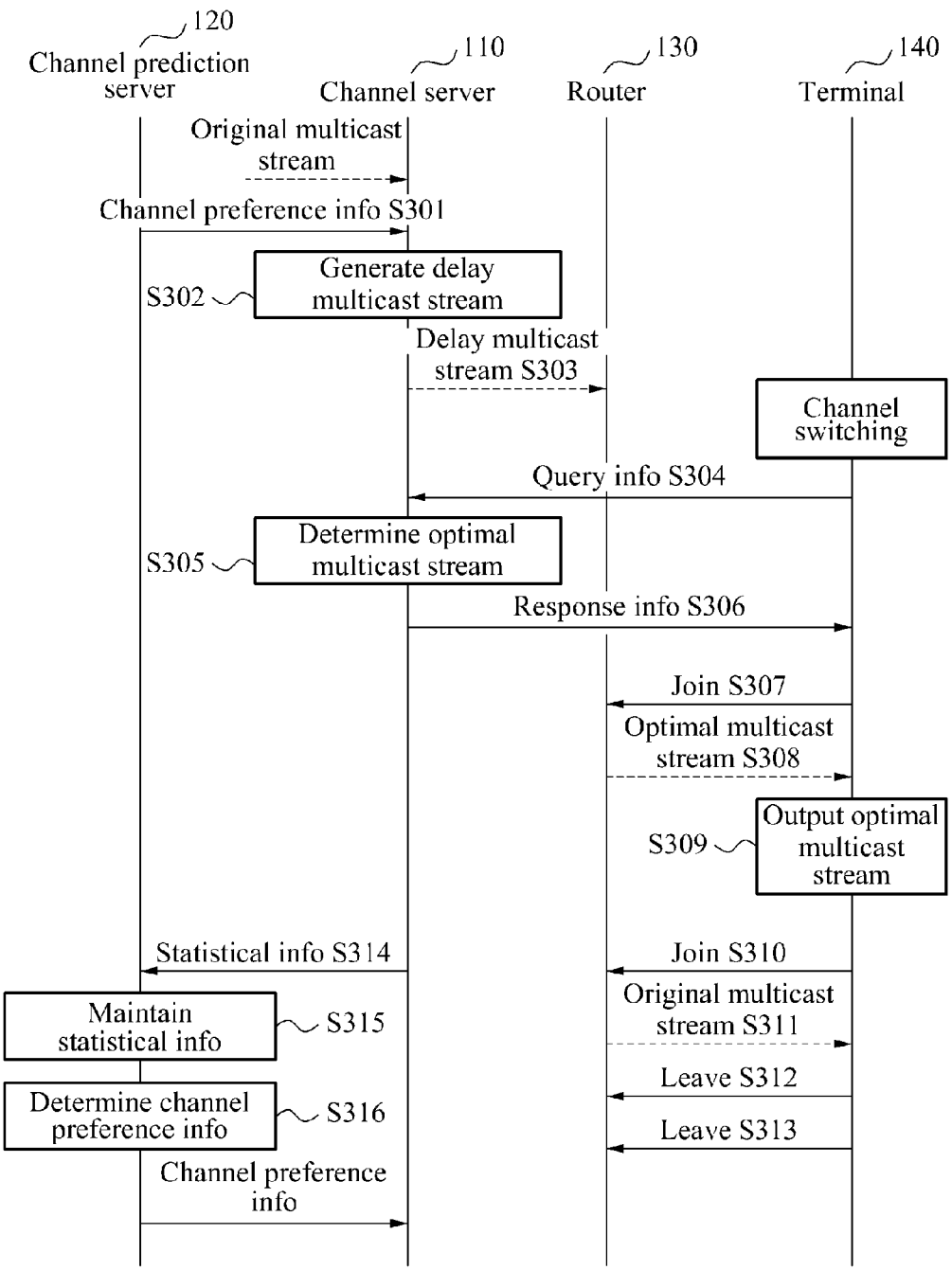
FIG. 3 is a flowchart illustrating a method for a fast channel switching according to an embodiment of the present invention.

FIG. 3 is a flowchart illustrating a method for a fast channel switching according to an embodiment of the present invention.

In operation S301, a channel prediction server 120 may transmit channel preference information to a channel server 110 to generate at least one delay multicast stream with respect to an original multicast stream. When statistical data about the original multicast stream does not exist, the channel prediction server 120 may transfer, to the channel server 110, channel setting information set by a manager or basic channel setting information of a system.

In operation S302, the channel server 110 may generate the at least one delay multicast stream from the original multicast stream based on the received channel preference information.

In operation S303, the channel server 110 may output, to the router 130, the generated at least one delay multicast stream in which a different time delay is applied based on the channel preference information.

In operation S304, a terminal 140 may transmit, to the channel server 110, query information associated with an optimal multicast stream using a predetermined channel ID such as a multicast group address and the like of a corresponding channel in response to a channel switching request of a user.

In operation S305, the channel server 110 may analyze the at least one delay multicast stream in response to the query information, and may determine the optimal multicast stream. In operation S306, the channel server 110 may transmit, to the terminal 140, response information associated with the determined optimal multicast stream. The response information may include a group address and a port value of the optimal multicast stream, a group address and a port value of the original multicast stream, a shift time, and program designation information.

In operation S307, the terminal 140 may request the router 130 for an IGMP group join using the group address of the optimal multicast stream included in the response information. In operation S308, the terminal 140 may receive the optimal multicast stream from the router 130 using the port value and program designation information. In operation S309, the terminal 140 may decode the optimal multicast stream and output the decoded multicast stream to a display.

When the shift time is elapsed from a group join time of the optimal multicast stream, the terminal 140 may request the router 130 for an IGMP group join using the group address of the original multicast stream in operation S310. In operation S311, the terminal 140 may receive the original multicast stream from the router 130 using the port value and the program designation information. The terminal 140 may decode the received original multicast stream and output the decoded original multicast stream to the display.

The terminal 140 may request the router 130 for an IGMP group leave with respect to the optimal multicast stream in operation S312, and may perform the router 130 for an IGMP group leave with respect to the original multicast stream in operation S313.

In operation S314, the channel server 110 may periodically or immediately report to the channel prediction server 120 about statistical information requested by the terminal 140. The statistical information may include, for example, the original multicast stream address and a number of queries.

In operation S315, the channel prediction server 120 may store and update the statistical information in a database. In operation S316, the channel prediction server 120 may predict a program rating for each channel based on the statistical information, and determine channel preference information. The channel preference information may include number information associated with a number of delay multicast streams to be generated.

The channel preference information may be transferred to the channel server 110. The channel server 110 may correct the number information based on the channel preference information, and generate the delay multicast streams.

Figure 4:
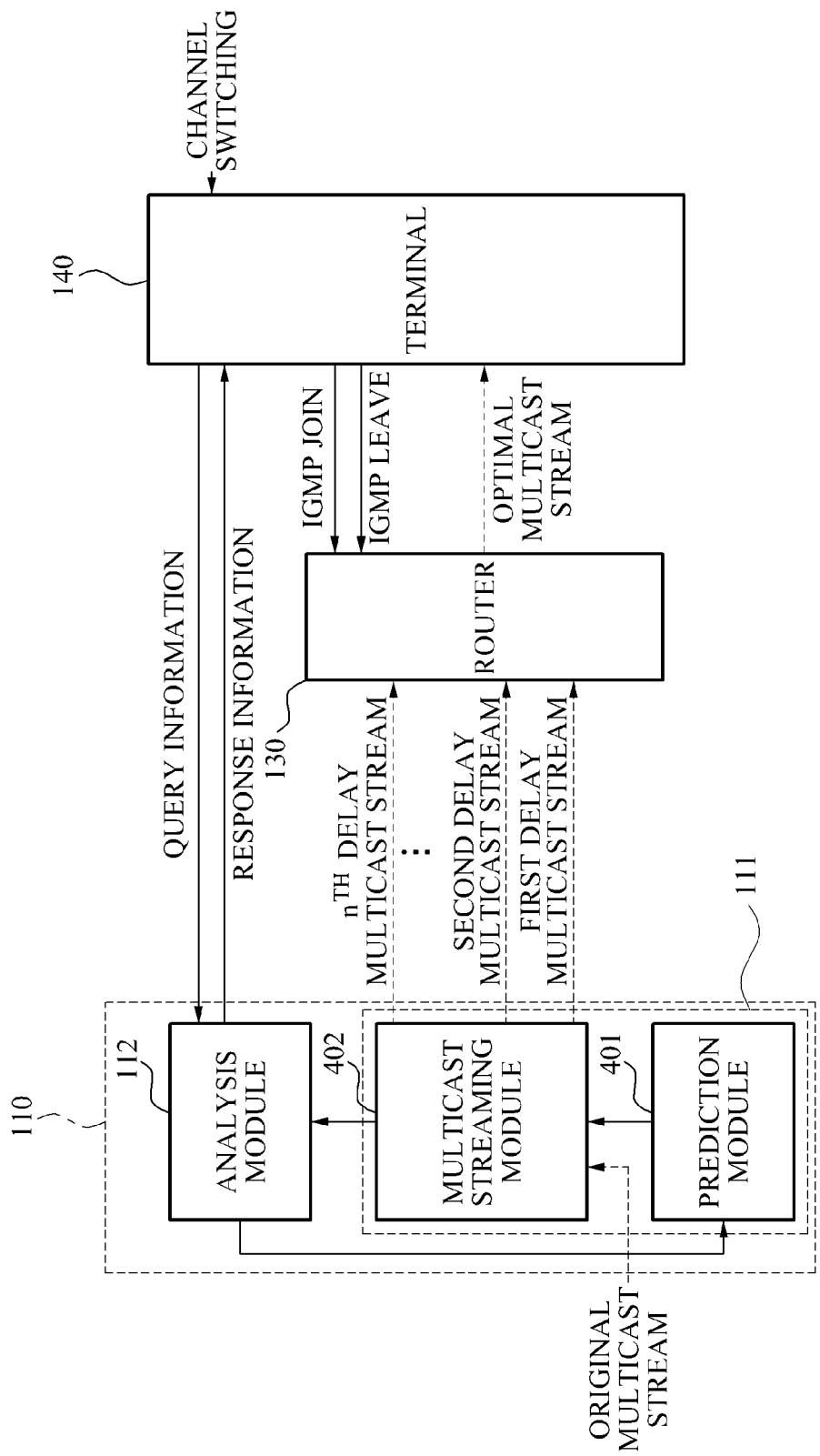
FIG. 4 is a block diagram illustrating a structure of a channel server and a terminal according to another embodiment of the present invention.

FIG. 4 is a block diagram illustrating a structure of a channel server 110 and a terminal 140 according to another embodiment of the present invention.

As shown in FIG. 4, the channel server 110 may include a streaming module 111 and an analysis module 112. The streaming module 111 may include a prediction module 401 and a multicast streaming module 402. The streaming module 111 may generate at least one delay multicast stream from an original multicast stream by applying a different delay value based on channel preference information. As described above, the streaming module 111 may include the prediction module 401 and the multicast streaming module 402.

The prediction module 401 may determine the channel preference information based on statistical information stored in association with the original multicast stream. The channel preference information may include number information associated with a number of the at least one delay multicast stream. The statistical information may include, for example, information associated with the original multicast stream and user information. The number information may be determined based on an available bandwidth of the channel server 110.

The prediction module 401 may analyze a program rating of the original multicast stream based on the statistical information according to at least one prediction algorithm, and determine the number information based on the analyzed program rating. The at least one prediction algorithm may include, for example, a neural network algorithm and a genetic algorithm.

The prediction module 401 may perform the same or similar functions to the channel prediction server 120 of FIG. 2 and thus may determine the channel preference information based on the statistical information and transfer the channel preference information to the multicast streaming module 402.

The multicast streaming module 402 may generate the at least one delay multicast stream from the original multicast stream based on the channel preference information.

The analysis module 112 may receive, from the terminal 140, query information associated with the original multicast stream and thereby may determine an optimal multicast stream among the at least one delay multicast stream and transmit response information associated with the optimal multicast stream to the terminal 140. The analysis module 112 may analyze in real time a decodable I-frame with respect to the original multicast stream, and determine, as the optimal multicast stream, a delay multicast stream capable of providing the decodable I-frame based on the analysis result.

The analysis module 112 may determine the optimal multicast stream based on at least one of a received time of the query information, a stream processing delay time, and a network delay time.

Matters not described in relation to the channel server 110 of FIG. 4 may be the same as the aforementioned description made above with reference to FIGS. 1 through 3, or may be easily conceived by those skilled in the art from the description. Accordingly, further detailed description will be omitted.

Figure 5:
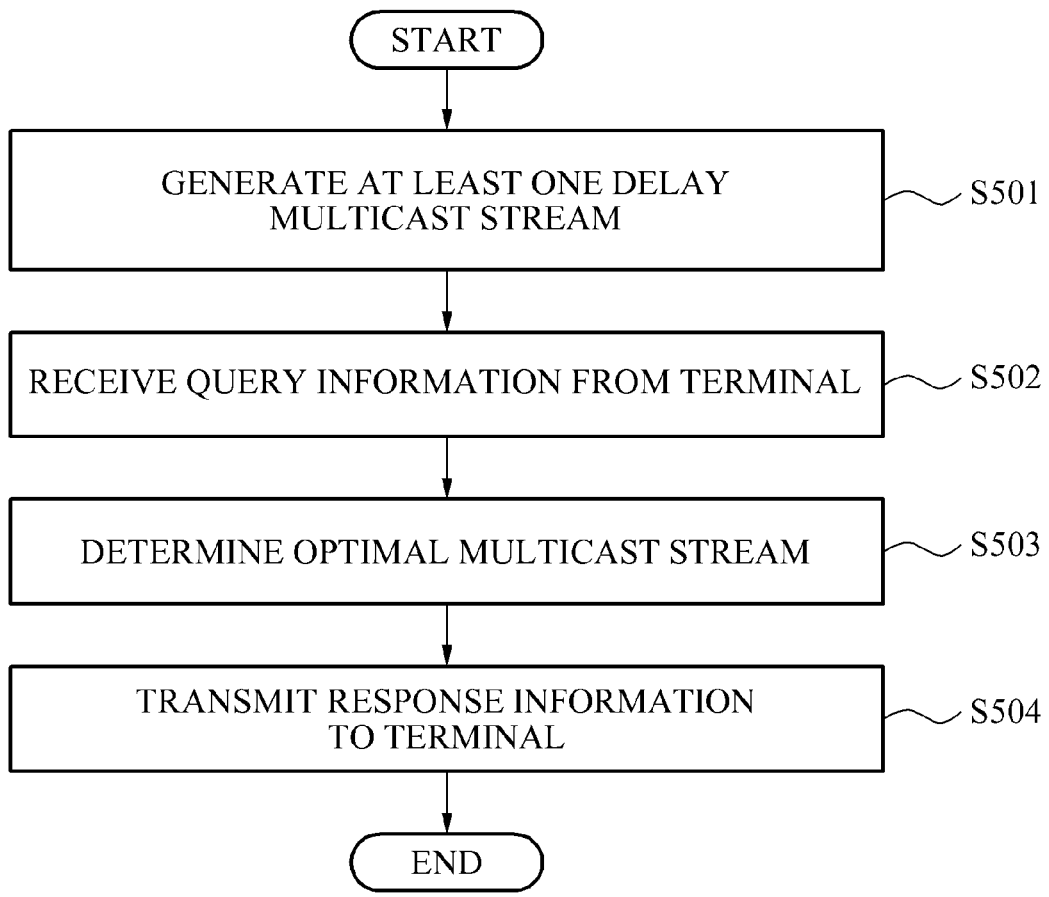
FIG. 5 is a flowchart illustrating a method for a fast channel switching at a channel server according to an embodiment of the present invention.

FIG. 5 is a flowchart illustrating a method for a fast channel switching at the channel server 110 according to an embodiment of the present invention.

In operation S501, the channel server 110 may generate at least one delay multicast stream from an original multicast stream by applying a different delay value based on channel preference information. The channel preference information may include number information associated with a number of the at least one delay multicast stream, and may be received from a channel prediction server 120. The channel prediction server 120 may determine the number information based on statistical information stored in association with the original multicast stream.

The statistical information may include information associated with the original multicast stream and user information. The channel prediction server 120 may analyze a program rating of the original multicast stream based on the statistical information according to at least one prediction algorithm, and determine the number information based on the analyzed program rating. The at least one prediction algorithm may include a neural network algorithm and a genetic algorithm. The number information may be determined based on an available bandwidth of the channel server 110.

According to an embodiment of the present invention, in operation S501, the channel server 110 may determine number information based on statistical information in association with the original multicast stream, and may generate at least one delay multicast stream from the original multicast stream based on the number information. The channel preference information may include the number information associated with a number of the at least one delay multicast stream generated from the original multicast stream.

In operation S502, the channel server 110 may receive, from the terminal 140, query information associated with the original multicast stream.

In operation S503, the channel server 110 may determine an optimal multicast stream among the at least one delay multicast stream. For example, the channel server 110 may analyze in real time a decodable I-frame with respect to the original multicast stream, and may determine, as the optimal multicast stream, a delay multicast stream capable of providing the decodable I-frame among the at least one delay multicast stream based on the analysis result. The optimal multicast stream may be determined based on at least one of a received time of the query information, a stream processing delay time, and a network delay time.

In operation S504, the channel server 110 may transmit, to the terminal 140, response information associated with the optimal multicast stream.

Matters not described in relation to operations S501 through S504 may be the same as the aforementioned description made above with reference to FIGS. 1 through 4, or may be easily conceived by those skilled in the art from the description. Accordingly, further detailed description will be omitted.

Figure 6:
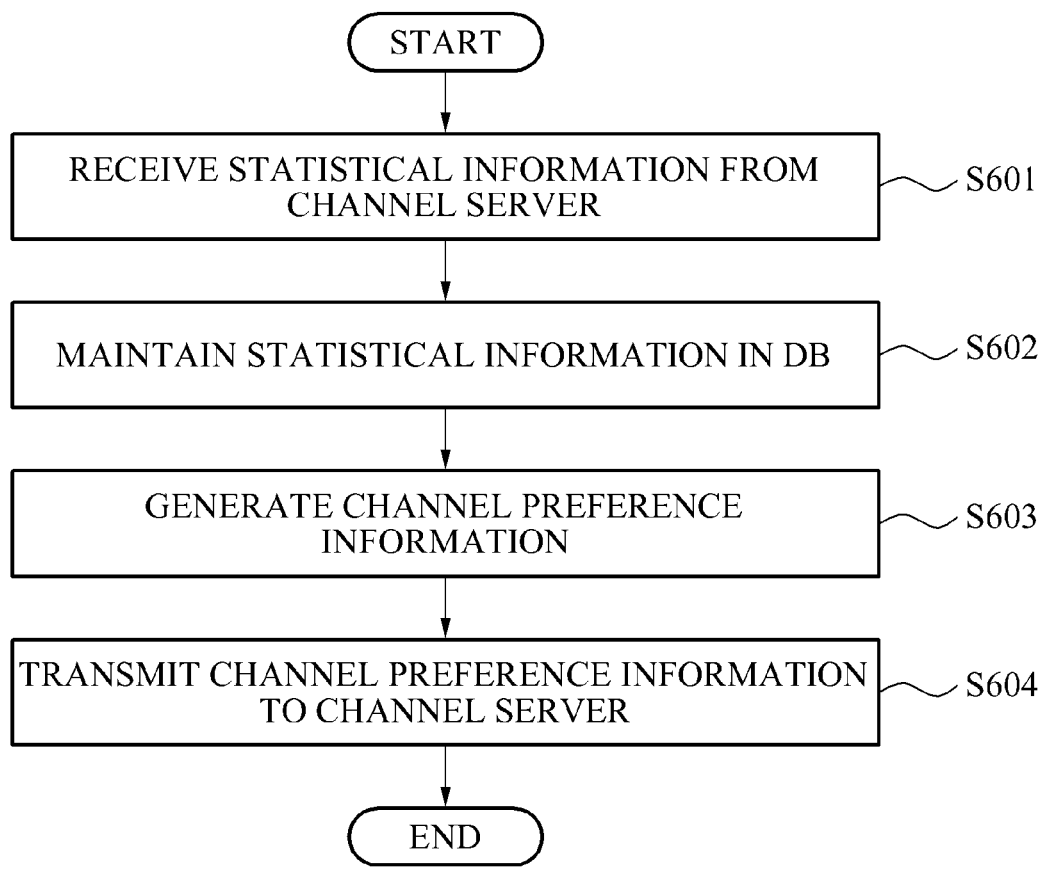
FIG. 6 is a flowchart illustrating a method for a fast channel switching at a channel prediction server according to an embodiment of the present invention.

FIG. 6 is a flowchart illustrating a method for a fast channel switching at the channel prediction server 120 according to an embodiment of the present invention.

As shown in FIG. 6, the fast channel switching method may be performed through S601 through S604. Operations S601 through S604 may be performed by the channel prediction server 120.

In operation S601, the channel prediction server 120 may receive statistical information associated with an original multicast stream from the channel server 110. The statistical information may be received in correspondence to a request to the channel server 110, or may be periodically received from the channel server 110. The statistical information may include information associated with the original multicast stream and user information.

In operation S602, the channel prediction server 120 may maintain the statistical information in the database 121.

In operation S603, the channel prediction server 120 may generate channel preference information associated with the original multicast stream based on the statistical information.

In operation S604, the channel prediction server 120 may transmit the channel preference information to the channel server 110. The channel preference information may be transmitted in correspondence to a request from the channel server 110, or may be periodically transmitted to the channel server 110. The channel server 110 may generate at least one delay multicast stream from the original multicast stream by applying a different delay value based on channel preference information. The channel preference information may include number information associated with a number of the at least one delay multicast stream.

The channel prediction server 120 may analyze a program rating of the original multicast stream based on the statistical information according to at least one prediction algorithm, and determine the number information based on the analyzed program rating.

Matters not described in relation to operations S601 through S604 may be the same as the aforementioned description made above with reference to FIGS. 1 through 5, or may be easily conceived by those skilled in the art from the description. Accordingly, further detailed description will be omitted.

Figure 7:
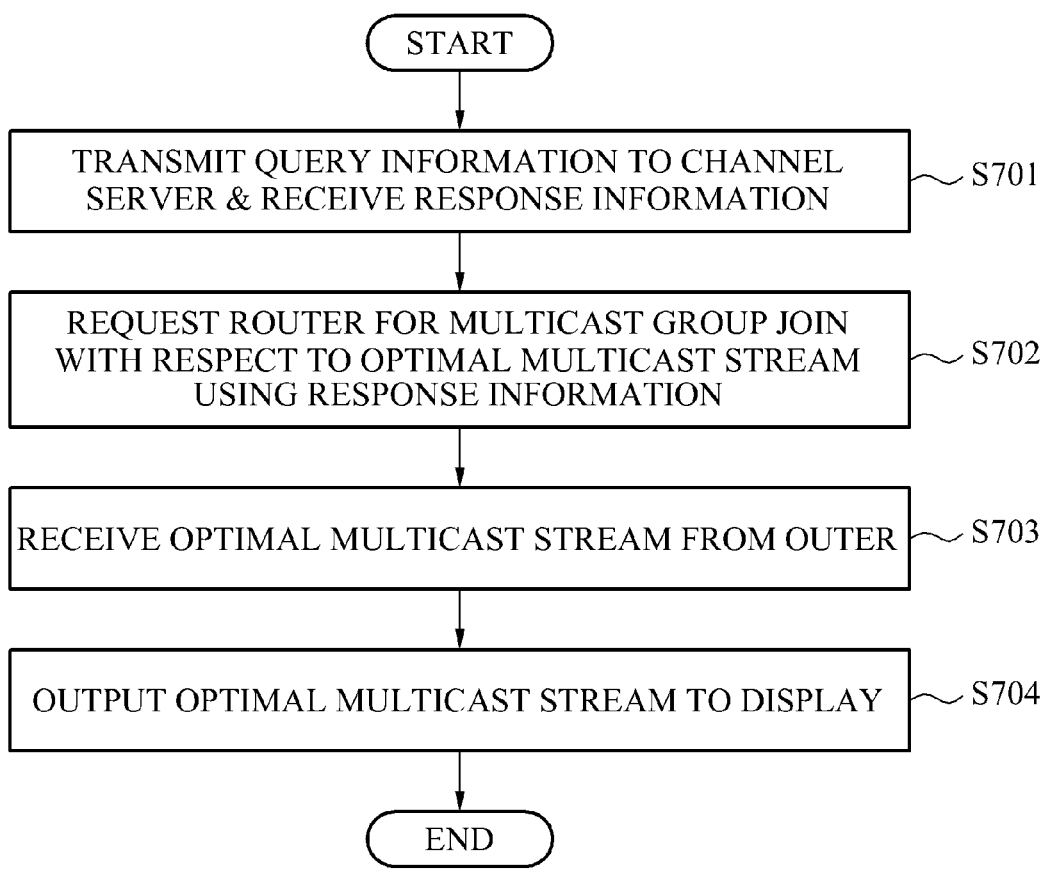
FIG. 7 is a flowchart illustrating a method for a fast channel switching at a terminal according to an embodiment of the present invention.

FIG. 7 is a flowchart illustrating a method for a fast channel switching at the terminal 140 according to an embodiment of the present invention.

As shown in FIG. 7, the fast channel switching method may be performed through S701 through S704. Operations S701 through S704 may be performed by the terminal 140.

In operation S701, the terminal 140 may transmit, to the channel server 110, query information associated with an original multicast stream, and may receive response information associated with an optimal multicast stream. The channel server 110 may generate at least one delay multicast stream from the original multicast stream by applying a different delay value based on channel preference information. In response to the query information, the channel server 110 may determine the optimal multicast stream among the at least one delay multicast stream, and may generate response information associated with the optimal multicast stream.

The channel preference information may include number information associated with a number of the at least one delay multicast stream generated from the original multicast stream. The channel server 110 may determine the number information based on statistical information stored in association with the original multicast stream, and may generate the at least one delay multicast stream from the original multicast stream based on the number information.

According to an embodiment of the present invention, the terminal 140 may receive the number information from the channel prediction server 120, and may generate at least one delay multicast stream from the original multicast stream based on the number information in operation S701.

In operation S702, the terminal 140 may request the router 130 for a multicast group join with respect to the optimal multicast stream using the response information. The terminal 140 may join the multicast group with respect to the optimal multicast stream. When a predetermined period of time is elapsed, the terminal 140 may request the router 130 for a group join with respect to the original multicast stream using the response information.

In operation S703, the terminal 140 may receive the optimal multicast stream from the router 130. The terminal 140 may receive the original multicast stream from the router 130.

In operation S704, the terminal 140 may output the optimal multicast stream to the display 145. The terminal 140 may also output the original multicast stream to the display 145.

Matters not described in relation to operations S701 through S704 may be the same as the aforementioned description made above with reference to FIGS. 1 through 6, or may be easily conceived by those skilled in the art from the description. Accordingly, further detailed description will be omitted.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A channel server comprising:
   a streaming module to generate a plurality of delay multicast streams from an original multicast stream, wherein each of the delay multicast streams is generated by applying a different delay value to the original multicast stream, and wherein the number of the plurality of delay multicast streams to be generated is determined based on statistical information associated with the original multicast stream; and
   an analysis module to determine an optimal multicast stream from among the plurality of delay multicast streams, and to transmit, to a terminal, response information associated with the optimal multicast stream in response to query information associated with the original multicast stream received from the terminal.

2. The channel server of claim 1, wherein:
the streaming module generates the plurality of delay multicast streams based on channel preference information, wherein the channel preference information comprises number information indicating the number of the plurality of delay multicast streams to be generated, and wherein the channel preference information is received from a channel prediction server, and
the channel prediction server determines the number information based on the statistical information associated with the original multicast stream.

3. The channel server of claim 2, wherein the channel prediction server analyzes a program rating of the original multicast stream based on the statistical information according to at least one prediction algorithm, and determines the number information based on the analyzed program rating.

4. The channel server of claim 3, wherein the at least one prediction algorithm predicts a program rating of a channel selected from users, based on previous data of the selected channel.

5. The channel server of claim 3, wherein the number information is also determined based on an available bandwidth of the channel server.

6. The channel server of claim 1, wherein the analysis module analyzes in real time a decodable Independent-frame (I-frame) with respect to the original multicast stream, and determines, as the optimal multicast stream, a delay multicast stream from among the plurality of delay multicast streams that is capable of most rapidly providing the decodable I-frame to the terminal based on the analysis result.

7. The channel server of claim 6, wherein the analysis module determines the optimal multicast stream based on at least one of a received time of the query information, a stream processing delay time, or a delay time occurring due to a query of the terminal with respect to the original multicast stream.

8. The channel server of claim 1, wherein:
the streaming module generates the plurality of delay multicast streams based on channel preference information, wherein the channel preference information comprises number information indicating the number of the plurality of delay multicast streams to be generated from the original multicast stream, and
the streaming module comprises:
a prediction module to determine the number information based on the statistical information associated with the original multicast stream; and
a multicast streaming module to generate the plurality of delay multicast streams from the original multicast stream based on the number information.

9. A channel prediction server comprising:
a database to receive statistical information associated with an original multicast stream from a channel server, and to maintain the statistical information; and
a prediction module to generate channel preference information associated with the original multicast stream based on the statistical information, and to transmit the channel preference information to the channel server,
wherein the channel server generates a plurality of delay multicast streams from the original multicast stream based on the channel preference information, wherein each of the delay multicast streams is generated by applying a different delay value to the original multicast stream, and wherein the channel server determines the optimal multicast stream from among the plurality of delay multicast streams,
wherein the channel preference information indicates the number of the plurality of delay multicast streams to be generated, and wherein the number of the plurality of delay multicast streams to be generated is determined based on the statistical information associated with the original multicast stream.

10. The channel prediction server of claim 9, wherein:
the database receives the statistical information in correspondence to a request to the channel server, or periodically receives the statistical information from the channel server, and
the prediction module transmits the channel preference information in correspondence to a request from the channel server, or periodically transmits the channel preference information to the channel server.

11. The channel prediction server of claim 9, wherein the channel preference information comprises number information indicating the number of the plurality of delay multicast streams to be generated.

12. The channel prediction server of claim 11, wherein the prediction module analyzes a program rating of the original multicast stream based on the statistical information according to at least one prediction algorithm, and determines the number information based on the analyzed program rating.

13. A terminal comprising:
a channel query module to transmit, to a channel server, query information associated with an original multicast stream, and to receive response information associated with an optimal multicast stream;
an Internet Group Management Protocol (IGMP) module to request a router for a multicast group join with respect to the optimal multicast stream based on the response information;
a stream parsing module to receive the optimal multicast stream from the router; and
a stream decoder to output the optimal multicast stream to a display,
wherein the channel server generates a plurality of delay multicast streams from the original multicast stream, wherein each of the delay multicast streams is generated by applying a different delay value to the original multicast stream, wherein the number of the plurality of delay multicast steams to be generated is determined based on statistical information associated with the original multicast stream, and wherein the channel server determines the optimal multicast stream from among the plurality of delay multicast streams, and transmits, to the terminal, response information associated with the optimal multicast stream in response to the query information.

14. The terminal of claim 13, wherein:
the IGMP module joins a multicast group with respect to the optimal multicast stream and, when a predetermined period of time is elapsed, the IGMP module requests the router for a group join with respect to the original multicast stream,
the stream parsing module receives the optimal multicast stream or the original multicast stream from the router, and
the stream decoder outputs the optimal multicast stream or the original multicast stream to the display.

15. The terminal of claim 14, wherein the IGMP module joins the multicast group with respect to the optimal multicast stream and, when the predetermined period of time is elapsed, the IGMP module requests the router for the group join with respect to the original multicast stream using the response information, and requests the router for a group leave with respect to the optimal multicast stream using the response information.

16. The terminal of claim 13, wherein:
the IGMP module joins a multicast group with respect to the optimal multicast stream, and requests the router for a group join with respect to the original multicast group using the response information, and
the stream parsing module receives the optimal multicast stream from the router and when a predetermined period of time is elapsed, the stream parsing module receives the original multicast stream from the router.

17. The terminal of claim 13, wherein:
the channel server generates the plurality of delay multicast streams based on channel preference information, wherein the channel preference information comprises number information indicating the number of the plurality of delay multicast streams to be generated, and
the channel server determines the number information based on the statistical information associated with the original multicast stream, and generates the plurality of delay multicast streams from the original multicast stream based on the number information.

18. The terminal of claim 13, wherein:
the channel server generates the plurality of delay multicast streams based on channel preference information, wherein the channel preference information comprises number information indicating the number of the plurality of delay multicast streams to be generated, and
the channel server receives the channel preference information from a channel prediction server, and generates the plurality of delay multicast streams from the original multicast stream based on the number information.

* * * * *